US012410818B2

(12) United States Patent
Nelson et al.

(10) Patent No.: US 12,410,818 B2
(45) Date of Patent: Sep. 9, 2025

(54) HYDROGEN RECIRCULATION PUMP HEATING AND SEALING ASSEMBLIES AND METHODS

(71) Applicants: CUMMINS INC., Columbus, IN (US); HYDROGENICS CORPORATION, Mississauga (CA)

(72) Inventors: Christopher Nelson, Columbus, IN (US); Bryn Epp, Barrie (CA); Nathaniel Ian Joos, Toronto (CA)

(73) Assignees: CUMMINS INC., Columbus, IN (US); HYDROGENICS CORPORATION, Mississauga (CA)

( * ) Notice: Subject to any disclaimer, the term of this patent is extended or adjusted under 35 U.S.C. 154(b) by 148 days.

(21) Appl. No.: 18/482,858

(22) Filed: Oct. 7, 2023

(65) Prior Publication Data
US 2024/0128483 A1 Apr. 18, 2024

Related U.S. Application Data

(60) Provisional application No. 63/379,557, filed on Oct. 14, 2022.

(51) Int. Cl.
H01M 8/04089 (2016.01)
F04D 13/06 (2006.01)
(Continued)

(52) U.S. Cl.
CPC ........... F04D 29/588 (2013.01); F04D 13/06 (2013.01); F04D 25/06 (2013.01);
(Continued)

(58) Field of Classification Search
CPC ........ F04D 29/588; F04D 13/06; F04D 25/06; F04D 25/0606; F04D 29/046;
(Continued)

(56) References Cited

U.S. PATENT DOCUMENTS 6,964,820 B2    11/2005  Shimonosono et al.
2008/0118787 A1  5/2008  Wexel et al.
(Continued)

FOREIGN PATENT DOCUMENTS

CN   111156181   5/2020
CN   113007122   6/2021
(Continued)

OTHER PUBLICATIONS

US Motors, Heaters and Trickle Voltage: Heating to Combat Motor Condensation, https://acim.nidec.com/motors/usmotors/techdocs/profacts/heaters-tricklevoltage.

Primary Examiner — Dominick L Plakkoottam
(74) Attorney, Agent, or Firm — Barnes & Thornburg LLP

(57) ABSTRACT

A recirculation pump includes an impeller, a pump motor assembly, and a heater. The pump motor assembly includes a pump housing having a pump cavity and a pump motor arranged in the pump cavity that drives the impeller, the pump housing arranged axially away from the impeller. The heater is disposed on or in the pump housing and spaced apart from the impeller. The heater is configured to increase a temperature of any portion of the fluid that leaks from the impeller into the pump cavity and resides in the pump cavity. The increase in the temperature causes the fluid that resides in the pump cavity to flow toward the impeller and exit the pump cavity.

20 Claims, 11 Drawing Sheets

(51) Int. Cl.
    *F04D 25/06*       (2006.01)
    *F04D 29/046*     (2006.01)
    *F04D 29/08*       (2006.01)
    *F04D 29/58*       (2006.01)
    *F04D 29/70*       (2006.01)
    *H01M 8/04007*   (2016.01)
    *H01M 8/04303*   (2016.01)
    *H01M 8/04701*   (2016.01)
    *H01M 8/04746*   (2016.01)
    *H01M 8/04955*   (2016.01)

(52) U.S. Cl.
    CPC ....... *F04D 25/0606* (2013.01); *F04D 29/046* (2013.01); *F04D 29/08* (2013.01); *F04D 29/584* (2013.01); *F04D 29/586* (2013.01); *F04D 29/706* (2013.01); *H01M 8/04007* (2013.01); *H01M 8/04097* (2013.01); *H01M 8/04303* (2016.02); *H01M 8/04708* (2013.01); *H01M 8/04753* (2013.01); *H01M 8/04955* (2013.01); *F05D 2260/6022* (2013.01)

(58) Field of Classification Search
    CPC ...... F04D 29/08; F04D 29/584; F04D 29/586; F04D 29/706; H01M 8/04007; H01M 8/04097; H01M 8/04303; H01M 8/04708; H01M 8/04753; H01M 8/04955; F05D 2260/6022

See application file for complete search history.

(56) References Cited

U.S. PATENT DOCUMENTS

2009/0169928 A1    7/2009    Nishimura et al.
2021/0190135 A1    6/2021    Pawellek et al.

FOREIGN PATENT DOCUMENTS

| | | | |
|---|---|---|---|
| CN | 113153769 | 7/2021 | |
| EP | 1770806 | 4/2007 | |
| JP | 2004190688 | 7/2004 | |
| KR | 20120115768 | 10/2012 | |
| WO | 2009/049715 | 4/2009 | |
| WO | 2012/022549 | 2/2012 | |
| WO | WO-2024050033 A1 * | 3/2024 | ........... B60H 1/3226 |

* cited by examiner

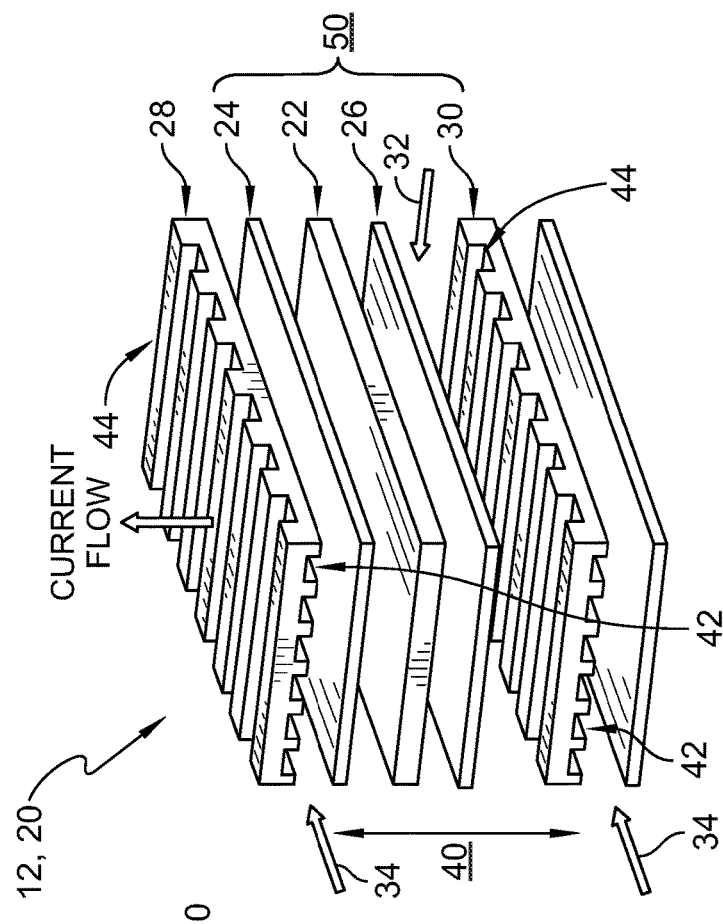
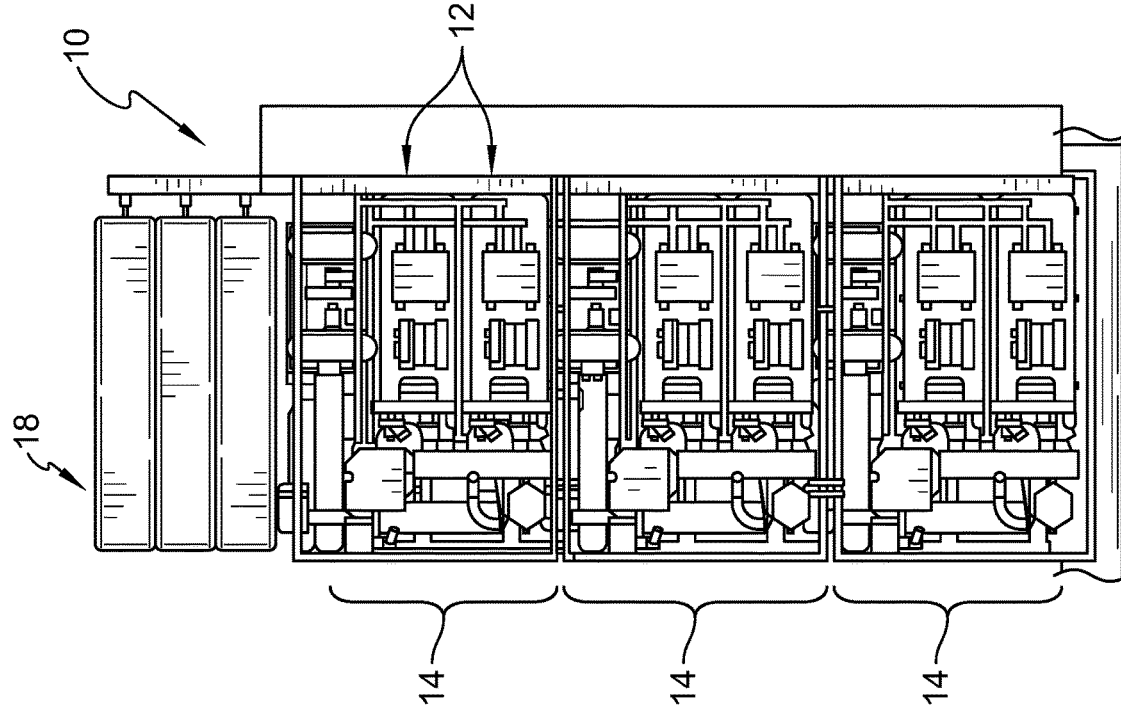
FIG. 1C
FIG. 1B

HYDROGEN RECIRCULATION PUMP HEATING AND SEALING ASSEMBLIES AND METHODS

CROSS-REFERENCE TO RELATED APPLICATIONS

This nonprovisional application claims the benefit and priority, under 35 U.S.C. § 119(e) and any other applicable laws or statutes, to U.S. Provisional Application Ser. No. 63/379,557 filed on Oct. 14, 2022, the entire disclosure of which is hereby expressly incorporated herein by reference.

TECHNICAL FIELD

The present disclosure generally relates to fuel cell assemblies, and in particular, hydrogen recirculation pumps of fuel cell assemblies.

BACKGROUND

A single fuel cell is one of many repeating units of a fuel cell stack that may provide power or energy for personal and/or industrial use. The typical proton exchange membrane (PEM) fuel cell is comprised of many fuel cell assemblies compressed and bound into a fuel cell stack. A PEM fuel cell is a multi-component assembly that often comprises a membrane electrode assembly (MEA) at the center, a gas diffusion layer (GDL) on either side of the membrane electrode assembly (MEA), and a bipolar plate (BPP) on either side of the gas diffusion layer (GDL). The membrane electrode assembly (MEA) is the component that enables electrochemical reactions in the fuel cell and/or fuel cell stack. Typically, a PEM fuel cell and/or fuel cell stack is assembled with the aforementioned components to operate in a useful and reliable manner.

In many mobility applications, the reactants supplied to the fuel cell are pure hydrogen for the anode and an oxidant for the cathode. In the cathode, nitrogen often accompanies oxygen as the supply is from atmospheric air to avoid onboard storage. The anode is typically supplied with pure hydrogen from highly compressed gaseous or liquefied hydrogen stored in onboard tanks. A cooling system is often required to provide a heat sink to manage excess heat produced during the electrochemical reactions, and to keep the fuel cell at an appropriate temperature during operation.

Typical PEM fuel cells use a hydrogen recirculation pump (HRP) to continually present fresh hydrogen to the PEM anode side. As hydrogen is consumed by the PEM fuel cell, it must be refreshed. While additional hydrogen is added, it is vital that the hydrogen is moved across the PEM cell to achieve peak performance.

With reactant gas molecules present in the active area, the MEA will produce a voltage potential, and current draw or load is supported by reactant flow rate. During the generation of electricity, moisture is created on the anode side of the cell and humidifies the hydrogen fuel such that humidified water may form. Moving or pumping, the (now humidified) hydrogen is done in several ways. Pumps of various types are employed as are ejector type systems. For pump-based systems, it is vital to the longevity of the pump that minimal water, which condenses from the humidified hydrogen, is permitted to reside within the pump's interior (pump motor cavity).

Accordingly, it would be advantageous to provide a fuel cell assembly, and in particular a pump system, that could at least remove water from inside the pump motor cavity or even prevent entry of water into the cavity altogether.

SUMMARY

According to a first aspect of the present disclosure, a recirculation pump for a fuel cell system includes an impeller, a pump motor assembly, and at least one heater. The impeller is configured to rotate and impel a fluid from an inlet to an outlet. The pump motor assembly includes a pump housing having a pump cavity therein and a pump motor arranged in the pump cavity and configured to drive the impeller, the pump housing arranged axially away from the impeller. The at least one heater is disposed on or in the pump housing and spaced apart from the impeller, the at least one heater being configured to increase a temperature of any portion of the fluid that leaks from the impeller into the pump cavity and resides in the pump cavity. The increase in the temperature causes the fluid that resides in the pump cavity to flow toward the impeller and exit the pump cavity.

In some embodiments, the recirculation pump further includes an impeller assembly including an impeller housing having an impeller cavity therein and having the inlet and the outlet, the inlet spaced apart from the outlet on a first side of the impeller housing. Each of the inlet and outlet opening into the impeller cavity. The impeller assembly further includes the impeller arranged in the impeller cavity and configured to impel the fluid entering the impeller cavity from the inlet to the outlet such that the fluid exits the impeller housing via the outlet.

In some embodiments, the pump housing is disposed on a second side of the impeller housing opposite the first side, and a first heater of the at least one heater is arranged on a second side of the pump housing opposite a first side of the pump housing facing the impeller housing. A second heater of the at least one heater is arranged on an outer surface of the pump housing axially between the first side and the second side of the pump housing. The second heater is located axially closer to the second side of the pump housing than the first side of the pump housing.

In some embodiments, at least one additional heater of the at least one heater and the second heater are arranged on the outer surface of the pump housing axially between the first side and the second side of the pump housing. The pump motor is coupled to the impeller via a drive shaft, and wherein the pump motor drives rotation of the drive shaft and rotation of the impeller.

In some embodiments, the recirculation pump further includes a bearing assembly arranged axially between the pump motor assembly and the impeller assembly, the bearing assembly including a bearing housing having a first side arranged on a second side of the impeller housing opposite the first side of the impeller housing and having a bearing cavity defined therein, the bearing assembly further including a bearing seal arranged in the bearing cavity. The drive shaft extends from the pump motor through the bearing cavity and to the impeller, and wherein the drive shaft is arranged within and rotatably supported by the bearing seal.

In some embodiments, the bearing assembly further includes a lip seal disposed within the bearing cavity between the bearing seal and the impeller and a grease material disposed within the bearing cavity between the lip seal and the bearing seal, the grease material being arranged adjacent to and abutting the bearing seal and arranged around a circumferential outer surface of the drive shaft. The lip seal is arranged so as to retain the grease material in position abutting the bearing seal, so as to allow pressure to escape the pump cavity, and so as to seal against pressure from the impeller cavity. In some embodiments, the lip seal is comprised of a fluoroelastomeric material and the grease material is comprised of a hydrogen resistant material. In some embodiments, the grease material is comprised of perfluoropolyether.

According to a further aspect of the present disclosure, a recirculation pump for a fuel cell system includes an impeller and a bearing assembly. The impeller includes a drive shaft centrally coupled to the impeller, the impeller being configured to rotate and impel a fluid from an inlet of the impeller to an outlet of the impeller. The bearing assembly is arranged axially away from the impeller, the bearing assembly including a bearing housing having a bearing cavity defined therein and a bearing seal arranged in the bearing cavity. The drive shaft extends from the impeller and through the bearing cavity. The drive shaft is arranged within and rotatably supported by the bearing seal. The bearing assembly further includes a lip seal disposed within the bearing cavity and a grease material disposed within the bearing cavity between the lip seal and the bearing seal.

In some embodiments, the lip seal is arranged so as to retain the grease material between the lip seal and the bearing seal, so as to allow pressure to escape the pump cavity, and so as to seal against pressure from the impeller cavity. In some embodiments, the lip seal is comprised of a fluoroelastomeric material and the grease material is comprised of a hydrogen resistant material. In some embodiments, the grease material is comprised of perfluoropolyether.

In some embodiments, the recirculation pump further includes a pump motor assembly and at least one heater. The pump motor assembly includes a pump housing having a pump cavity therein and a pump motor arranged in the pump cavity, the drive shaft being coupled to the pump motor such that the pump motor is configured to drive the impeller, the pump housing being arranged adjacent to the bearing housing on a side of the bearing housing opposite the impeller. The at least one heater is disposed on or in the pump housing and spaced apart from the bearing housing, the at least one heater being configured to increase a temperature of any portion of the fluid that leaks from the impeller, through the bearing cavity, and into the pump cavity and resides in the pump cavity. The increase in the temperature causes the fluid that resides in the pump cavity to flow toward the impeller and exit the pump cavity.

In some embodiments, a first heater of the at least one heater is arranged on a second side of the pump housing opposite a first side of the pump housing facing the bearing housing, and a second heater of the at least one heater is arranged on an outer surface of the pump housing axially between the first side and the second side of the pump housing.

According to a further aspect of the present disclosure, a method includes providing a pump motor assembly including a pump housing having a pump cavity therein and a pump motor arranged in the pump cavity, arranging at least one heater on or in the pump housing and spaced apart from an impeller, and rotating the impeller via the pump motor such that the impeller impels the fluid from an inlet of the impeller to an outlet of the impeller, wherein the pump housing is arranged axially away from the impeller. The method further includes, in response to the fuel cell system being shut off, via a controller, activating the at least one heater and increasing a temperature of any portion of the fluid that leaks from the impeller into the pump cavity and resides in the pump cavity. Increasing the temperature causes the fluid residing in the pump cavity to flow toward the impeller and exit the pump cavity. The method further includes, in response to the at least one heater having been active for a first amount of time based on a first operating condition of the fuel cell system, via the controller, deactivating the at least one heater.

In some embodiments, the first operating condition is when all fluid residing in the pump cavity has exited the pump cavity via the increase in temperature caused by the at least one heater.

BRIEF DESCRIPTION OF DRAWINGS

This disclosure will be more fully understood from the following detailed description taken in conjunction with the accompanying drawings, in which:

FIG. 1B is a cutaway view of an exemplary fuel cell system including an air delivery system, hydrogen delivery systems, and a plurality of fuel cell modules each including multiple fuel cell stacks;

FIG. 1C is a perspective view of an exemplary repeating unit of a fuel cell stack of the fuel cell system of FIG. 1A;

DETAILED DESCRIPTION

Figure 1A:
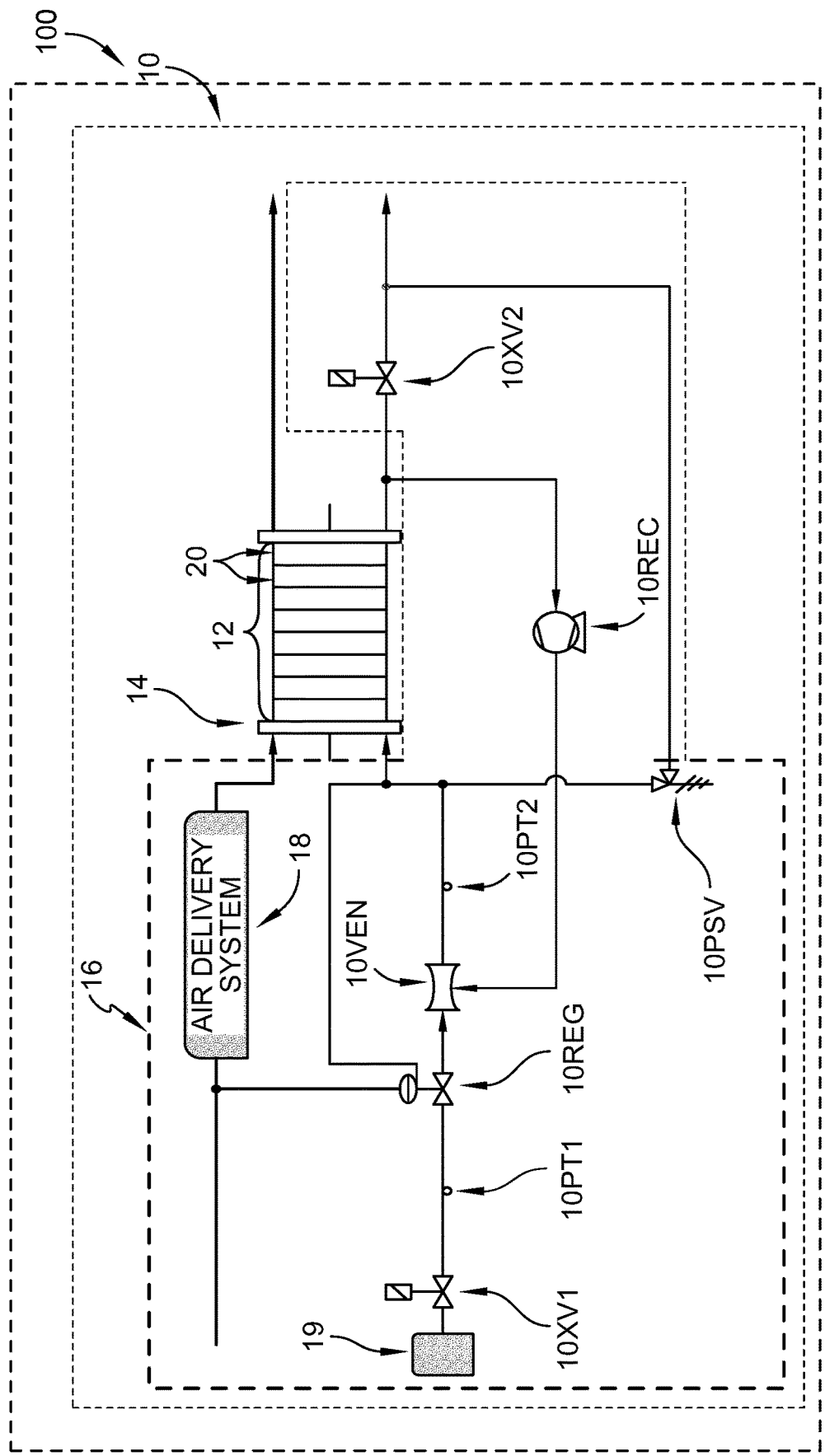
FIG. 1A is a schematic view of an exemplary fuel cell system including an air delivery system, a hydrogen delivery system, and a fuel cell module including a stack of multiple fuel cells.

As shown in FIG. 1A, fuel cell systems 10 often include one or more fuel cell stacks 12 ("STK") or fuel cell modules 14 connected to a balance of plant (BOP) 16, including various components, to support the electrochemical conversion, generation, and/or distribution of electrical power to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals, and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layers (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26, as shown in FIG. 1C. The above-mentioned components, in particular the bipolar plate 30, the gas diffusion layer (GDL) 26, the membrane electrode assembly (MEA) 22, and the gas diffusion layer (GDL) 24 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plates (BPP) 28, 30 can uniformly distribute reactants 32, 34 to an active area 40 of each fuel cell 20 through oxidant flow fields 42 and/or fuel flow fields 44 formed on outer surfaces of the bipolar plates (BPP) 28, 30. The active area 40, where the electrochemical reactions occur to generate electrical power produced by the fuel cell 20, is centered, when viewing the stack 12 from a top-down perspective, within the membrane electrode assembly (MEA) 22, the gas diffusion layers (GDL) 24, 26, and the bipolar plate (BPP) 28, 30.

Figure 1D:
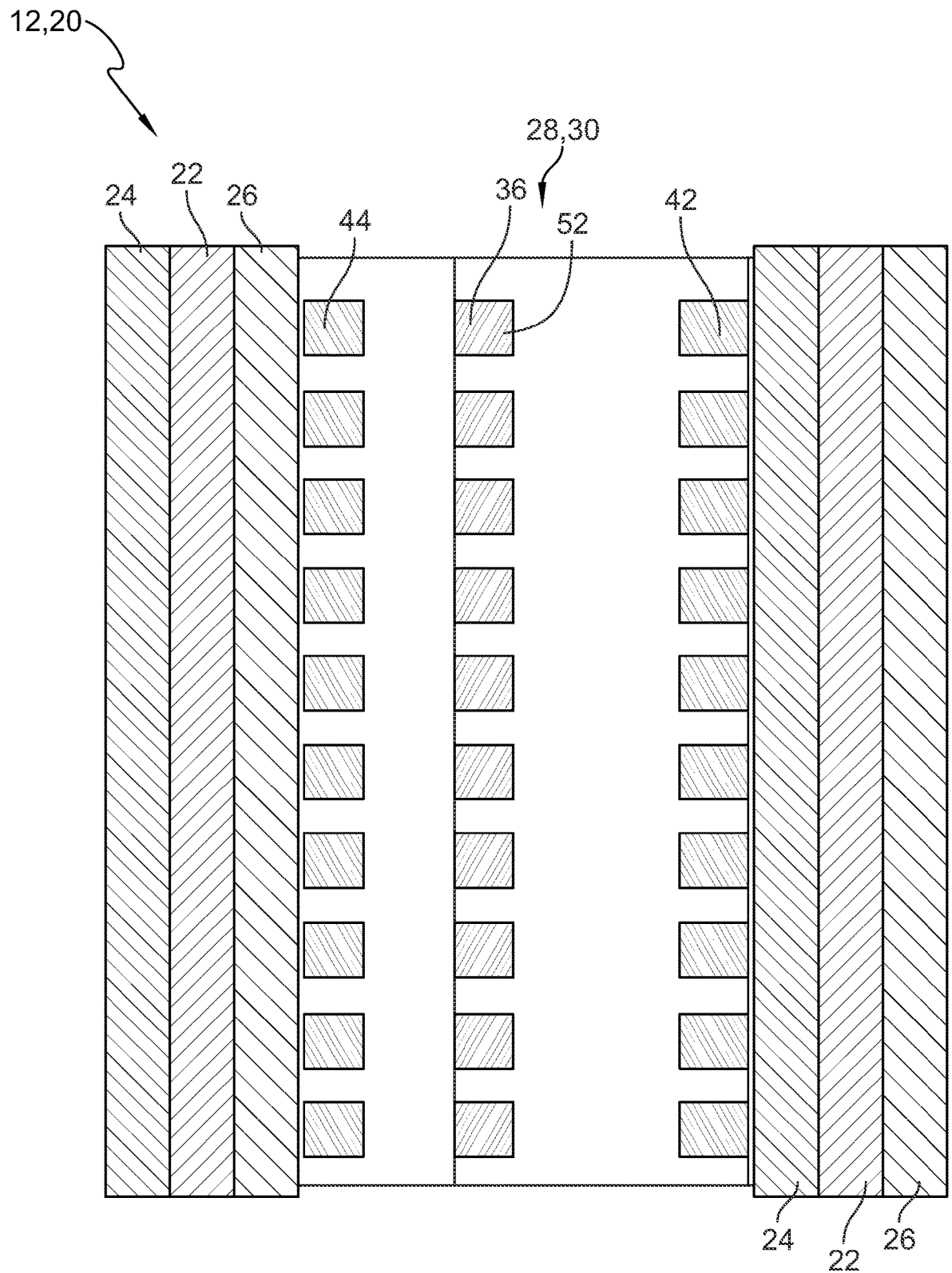
FIG. 1D is a cross-sectional view of an exemplary repeating unit of the fuel cell stack of FIG. 1C.

The bipolar plates (BPP) 28, 30 may each be formed to have reactant flow fields 42, 44 formed on opposing outer surfaces of the bipolar plate (BPP) 28, 30, and formed to have coolant flow fields 52 located within the bipolar plate (BPP) 28, 30, as shown in FIG. 1D. For example, the bipolar plate (BPP) 28, 30 can include fuel flow fields 44 for transfer of fuel 32 on one side of the plate 28, 30 for interaction with the gas diffusion layer (GDL) 26, and oxidant flow fields 42 for transfer of oxidant 34 on the second, opposite side of the plate 28, 30 for interaction with the gas diffusion layer (GDL) 24. As shown in FIG. 1D, the bipolar plates (BPP) 28, 30 can further include coolant flow fields 52 formed within the plate (BPP) 28, 30, generally centrally between the opposing outer surfaces of the plate (BPP) 28, 30. The coolant flow fields 52 facilitate the flow of cooling fluid 36 through the bipolar plate (BPP) 28, 30 in order to regulate the temperature of the plate (BPP) 28, 30 materials and the reactants. The bipolar plates (BPP) 28, 30 are compressed against adjacent gas diffusion layers (GDL) 24, 26 to isolate and/or seal one or more reactants 32, 34 within their respective pathways 44, 42 to maintain electrical conductivity, which is required for robust operation of the fuel cell 20 (see FIGS. 1C and 1D).

The fuel cell system 10 described herein, may be used in stationary and/or immovable power system, such as industrial applications and power generation plants. The fuel cell system 10 may also be implemented in conjunction with an air delivery system 18. Additionally, the fuel cell system 10 may also be implemented in conjunction with a hydrogen delivery system and/or a source of hydrogen 19 such as a pressurized tank, including a gaseous pressurized tank, cryogenic liquid storage tank, chemical storage, physical storage, stationary storage, an electrolysis system, or an electrolyzer. In one embodiment, the fuel cell system 10 is connected and/or attached in series or parallel to a hydrogen delivery system and/or a source of hydrogen 19, such as one or more hydrogen delivery systems and/or sources of hydrogen 19 in the BOP 16 (see FIG. 1A). In another embodiment, the fuel cell system 10 is not connected and/or attached in series or parallel to a hydrogen delivery system and/or a source of hydrogen 19.

In some embodiments, the fuel cell system 10 may include an on/off valve 10XV1, a pressure transducer 10PT1, a mechanical regulator 10REG, and a venturi 10VEN arranged in operable communication with each other and downstream of the hydrogen delivery system and/or source of hydrogen 19. The pressure transducer 10PT1 may be arranged between the on/off valve 10XV1 and the mechanical regulator 10REG. In some embodiments, a proportional control valve may be utilized instead of a mechanical regulator 10REG. In some embodiments, a second pressure transducer 10PT2 is arranged downstream of the venturi 10VEN, which is downstream of the mechanical regulator 10REG.

In some embodiments, the fuel cell system 10 may further include a recirculation pump 10REC downstream of the stack 12 and operably connected to the venturi 10VEN. The fuel cell system 10 may also include a further on/off valve 10XV2 downstream of the stack 12, and a pressure transfer valve 10PSV.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy-duty vehicle. Type of vehicles 100 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

In addition, it may be appreciated by a person of ordinary skill in the art that the fuel cell system 10, fuel cell stack 12, and/or fuel cell 20 described in the present disclosure may be substituted for any electrochemical system, such as an electrolysis system (e.g., an electrolyzer), an electrolyzer stack, and/or an electrolyzer cell (EC), respectively. As such, in some embodiments, the features and aspects described and taught in the present disclosure regarding the fuel cell system 10, stack 12, or cell 20 also relate to an electrolyzer, an electrolyzer stack, and/or an electrolyzer cell (EC). In further embodiments, the features and aspects described or taught in the present disclosure do not relate, and are therefore distinguishable from, those of an electrolyzer, an electrolyzer stack, and/or an electrolyzer cell (EC).

Figures 2A, 2B:
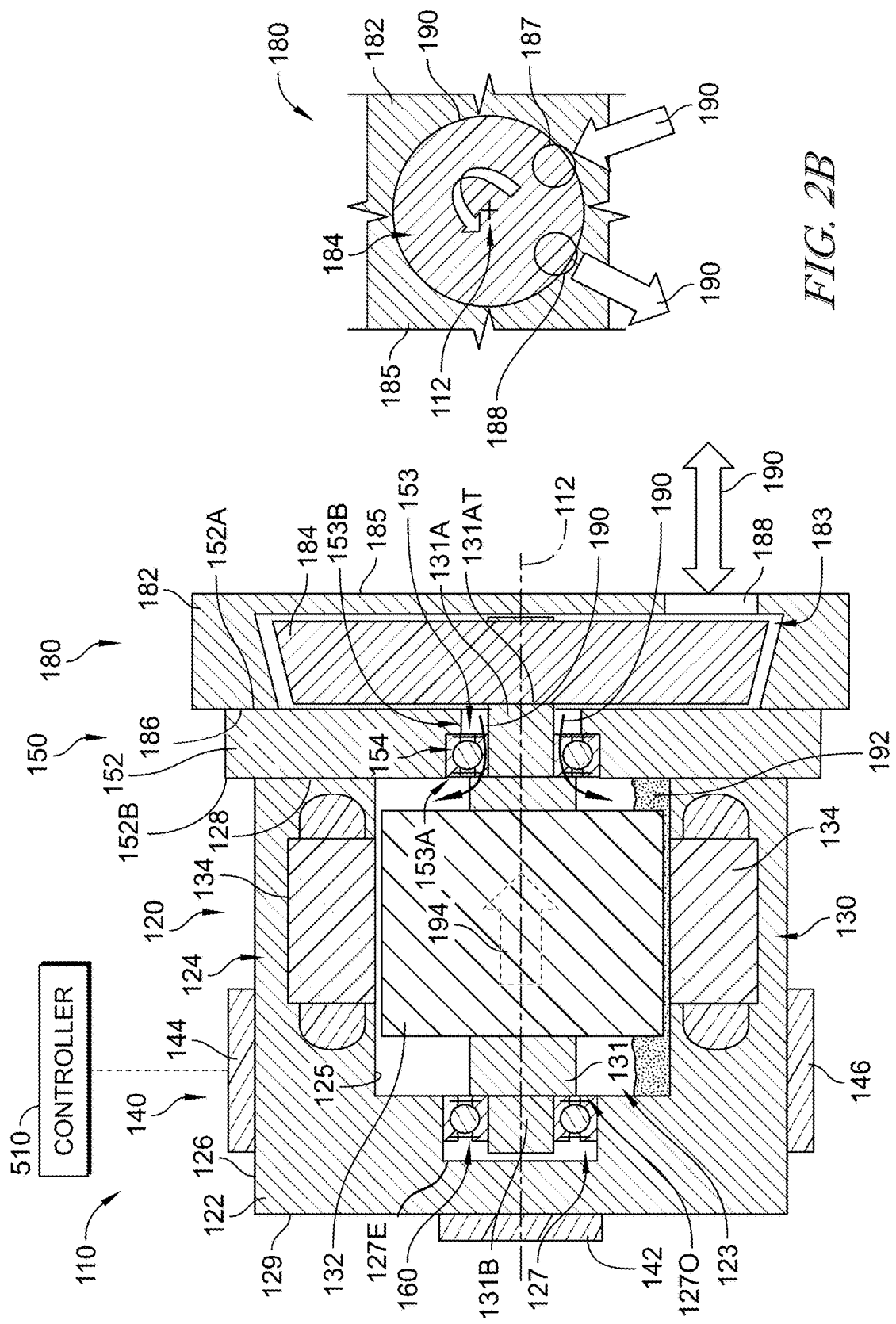
FIG. 2A is a cross-sectional view of a hydrogen recirculation pump according to a first aspect of the present disclosure, showing that the hydrogen recirculation pump includes an impeller, a pump motor assembly, and heaters disposed on a pump housing of the pump motor assembly.
FIG. 2B is a schematic front view of the impeller of the hydrogen recirculation pump of FIG. 2A.
Figures 4A, 4B:
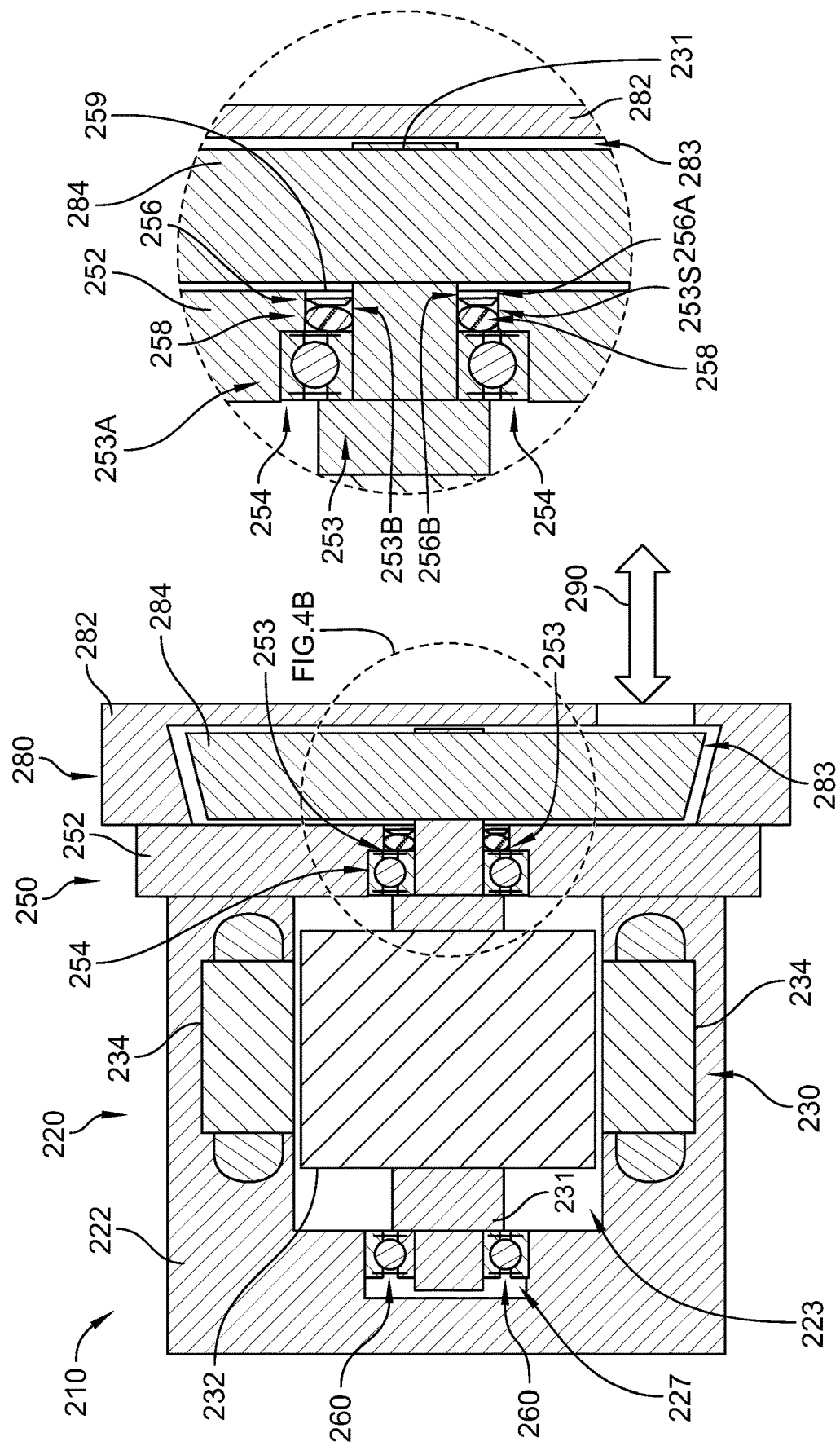
FIG. 4A is a cross-sectional view of a hydrogen recirculation pump according to a further aspect of the present disclosure, showing that the hydrogen recirculation pump includes an impeller, a pump motor assembly, and a bearing assembly between the impeller and the pump motor assembly, and showing that the bearing assembly including a bearing cavity through which a drive shaft of a pump motor of the pump motor assembly extends, a bearing seal arranged around the drive shaft in the bearing cavity, and a lip seal and a grease material arranged in the bearing cavity around the shaft and adjacent the bearing seal.
FIG. 4B is a cross-sectional view of the bearing seal, the lip seal, and the grease material of the hydrogen recirculation pump of FIG. 4A.
Figure 5:
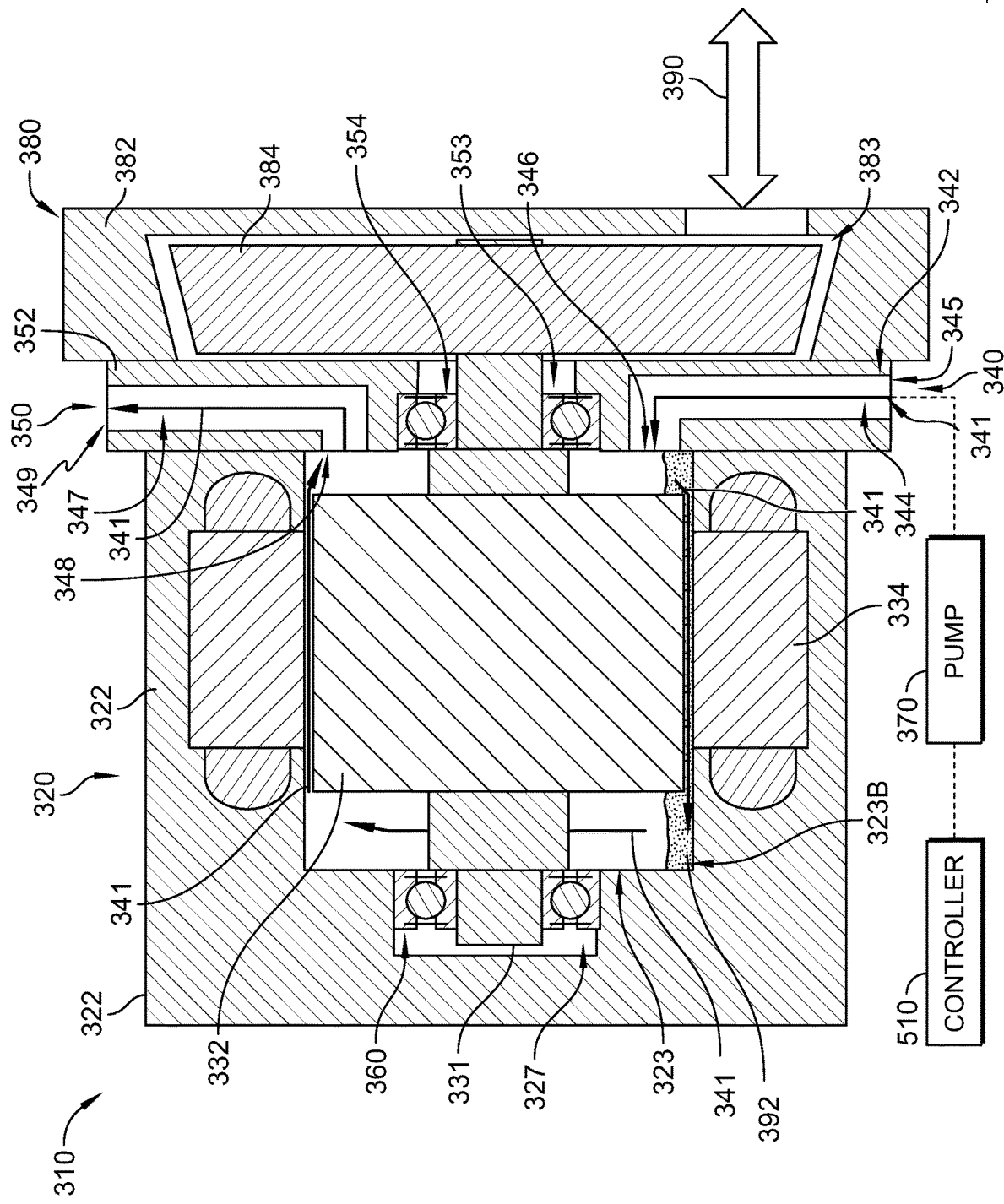
FIG. 5 is a cross-sectional view of a hydrogen recirculation pump according to a further aspect of the present disclosure, showing that the hydrogen recirculation pump includes a heating flow system configured to pump warm water through the pump cavity so as to heat condensed water residing in the pump cavity.

The present disclosure is directed to systems, assemblies, and methods of removing water from inside a pump motor cavity of a hydrogen recirculation pump and/or preventing entry of water into the cavity altogether. This is accomplished via the disclosed hydrogen recirculation pumps 110, 210, 310 (as shown in FIGS. 2A, 4A, and 5), which include a heater configured to heat water residing in the pump cavity so as to cause the water to move out of the pump cavity and/or a seal configured to keep water out of the pump cavity. The disclosed hydrogen recirculation pumps 110, 210, 310 are also resistant to damage from hydrogen flowing outside of the pump cavity that interacts with the seal. The hydrogen recirculation pumps 110, 210, 310 disclosed herein may be utilized with the fuel cell system 10 described above. A person skilled in the art will appreciate that the assemblies and methods described herein with reference to the hydrogen recirculation pumps 110, 210, 310 may be applicable to other types of pumps, including alternative types of recirculation pumps.

FIG. 2A shows a cross-section of the hydrogen recirculation pump 110 according to a first aspect of the present disclosure. As described above, the hydrogen recirculation pump 110 is configured to continually present fresh hydrogen to the anode side of a fuel cell 20 of the fuel cell stack 12 of the fuel cell system 10, which in some embodiments may be the gas diffusion layer 26, as shown in FIGS. 1C and 1D.

As can be seen in FIG. 2A, the hydrogen recirculation pump 110 includes a pump motor assembly 120, a bearing assembly 150, and an impeller assembly 180. As will be described in greater detail, various components of the assemblies 120, 150, 180 are configured to rotate about a central axis 112 of the pump 110. The pump motor assembly 120 is configured to drive an impeller 184 of the impeller assembly 180 (see FIG. 2B). Referring back to FIG. 2A, the bearing assembly 150 is configured to provide rotational support to a drive shaft 131 of a pump motor 130 of the pump motor assembly 120 via a bearing seal 154. Illustratively, the bearing assembly 150 is arranged axially between the pump motor assembly 120 and the impeller assembly 180.

The pump motor assembly 120 includes a pump housing 122 configured to house the components of the pump motor 130, as shown in FIG. 2A. The pump housing 122 may be formed with an outer wall 124 that defines a pump cavity 123 within which at least some of the components of the pump motor 130 are housed. In some embodiments, the outer wall 124 may be cylindrical such that the central axis of the cylindrical outer wall 124 extends in the same direction as the central axis 112 of the pump 110. In some embodiments, the central axis of the cylindrical outer wall 124 is colinear with the central axis 112 of the pump 110, as shown in FIG. 2A. Illustratively, the pump cavity 123 is defined by an inner surface 125 of the outer wall 124, as shown in FIG. 2A. In some embodiments, the inner surface 125 is also cylindrical. A person skilled in the art will understand that additional components or structures may be arranged on the inner surface 125 of the outer wall 124 such that the additional components or structures define the pump cavity 123.

As shown in FIG. 2A, at least some components of the pump motor 130 are arranged within the pump cavity 123 and operate therein. The pump motor 130 is configured to rotationally drive a central drive shaft 131 of the pump motor 130, which is coupled to the impeller 184 so as to drive the impeller 184. Illustratively, the pump motor 130 is an electric motor that includes the drive shaft 131, a rotor 132 circumferentially surrounding the drive shaft 131 and arranged in the pump cavity 123, and a plurality of stators 134 annularly arranged around and spaced apart from the rotor 132. In some embodiments, as shown in FIG. 2A, the stators 134 are arranged within the outer wall 124 and include coils configured to electromagnetically interact with magnets of the rotor 132 so as to selectively rotate the rotor 132. In some embodiments, the rotor 132 is cylindrical and generally matches the contour of the inner surface 125. A person skilled in the art will understand that motors other than electric motors may be utilized as the pump motor 130, so long as the motor is capable of rotating the impeller 184 at the requisite rotational speeds and torque required of the hydrogen recirculation pump 110.

The pump housing 122 may further include a support cavity 127 that is axially offset from the pump cavity 123 and opens into the pump cavity 123, as shown in FIG. 2A. In particular, the support cavity 127 may be formed as a cylindrical or annular cavity having one axial end opening 127O into the pump cavity 123 and the opposite axial end being an end wall 127E of the cavity 127 defined by the inner surface 125 of the outer wall 124. Illustratively, the diameter of the support cavity 127 is less than the diameter of the pump cavity 123, as shown in FIG. 2A. In some embodiments, the diameter of the support cavity 127 is approximately half of the diameter of the pump cavity 123.

Figure 2C:
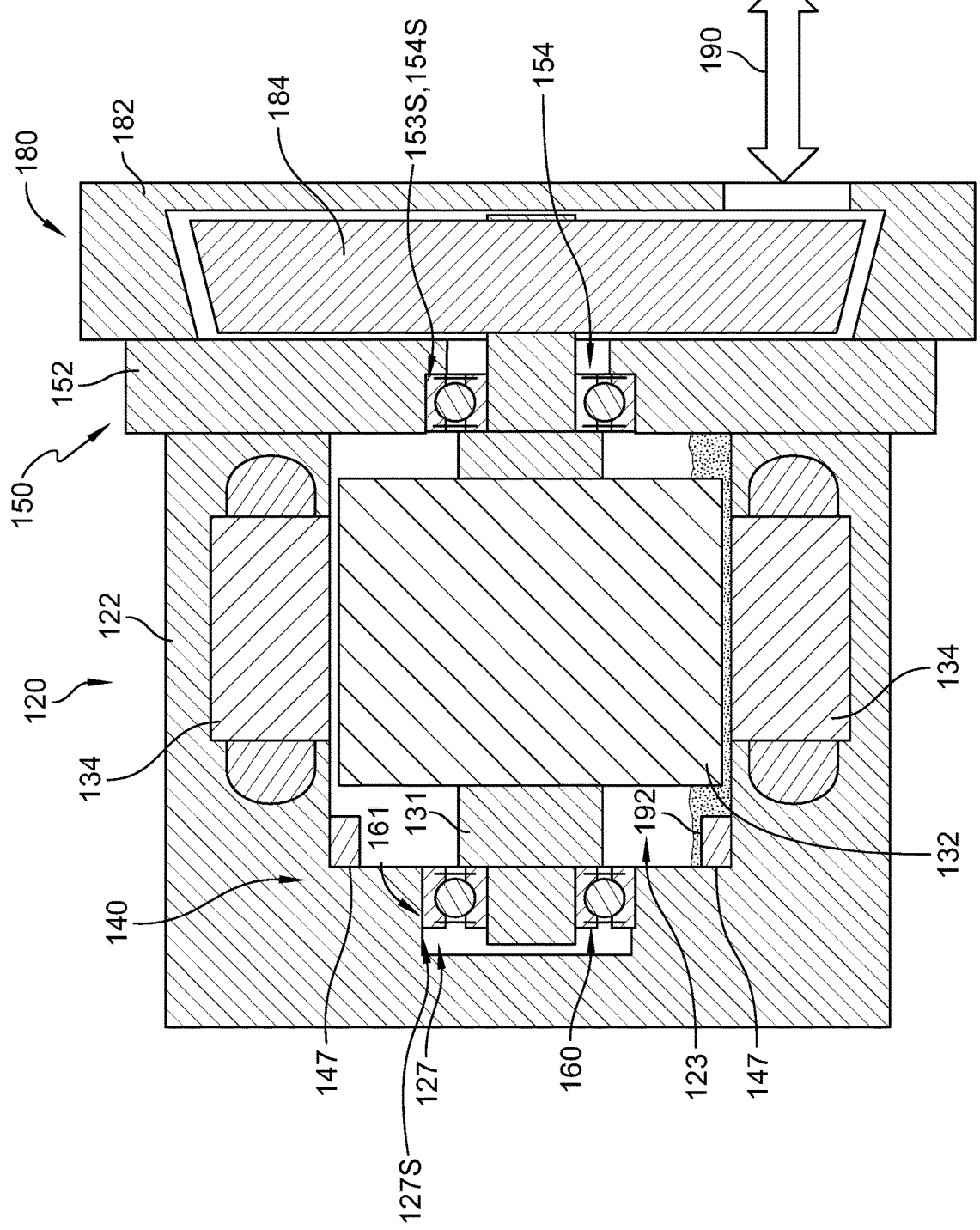
FIG. 2C is a cross-sectional view of the hydrogen recirculation pump of FIG. 2A, showing that the heaters arranged in the pump cavity of the pump housing.

As will be described in greater detail below, a first axial end portion 131A of the drive shaft 131 extends through the bearing assembly 150 and is coupled to the impeller 184, as shown in FIG. 2A. The first axial end portion 131A is rotationally supported within the bearing cavity 153 of the bearing housing 152 via a first bearing seal 154. Similarly, a second axial end portion 131B of the drive shaft 131 extends into the support cavity 127 and is rotationally supported therein via a second bearing seal 160. In some embodiments, the second bearing seal 160 may be sized such that an outer surface 161 of the bearing seal 160 contacts the inner surface 127S of the support cavity 127, as shown in FIG. 2C. A person skilled in the art will understand that any known type of bearing may be utilized as the first and second bearing seals 154, 160 so long as the bearings are capable of rotationally supporting the drive shaft 131 during operation of the pump 110.

Figure 2D:
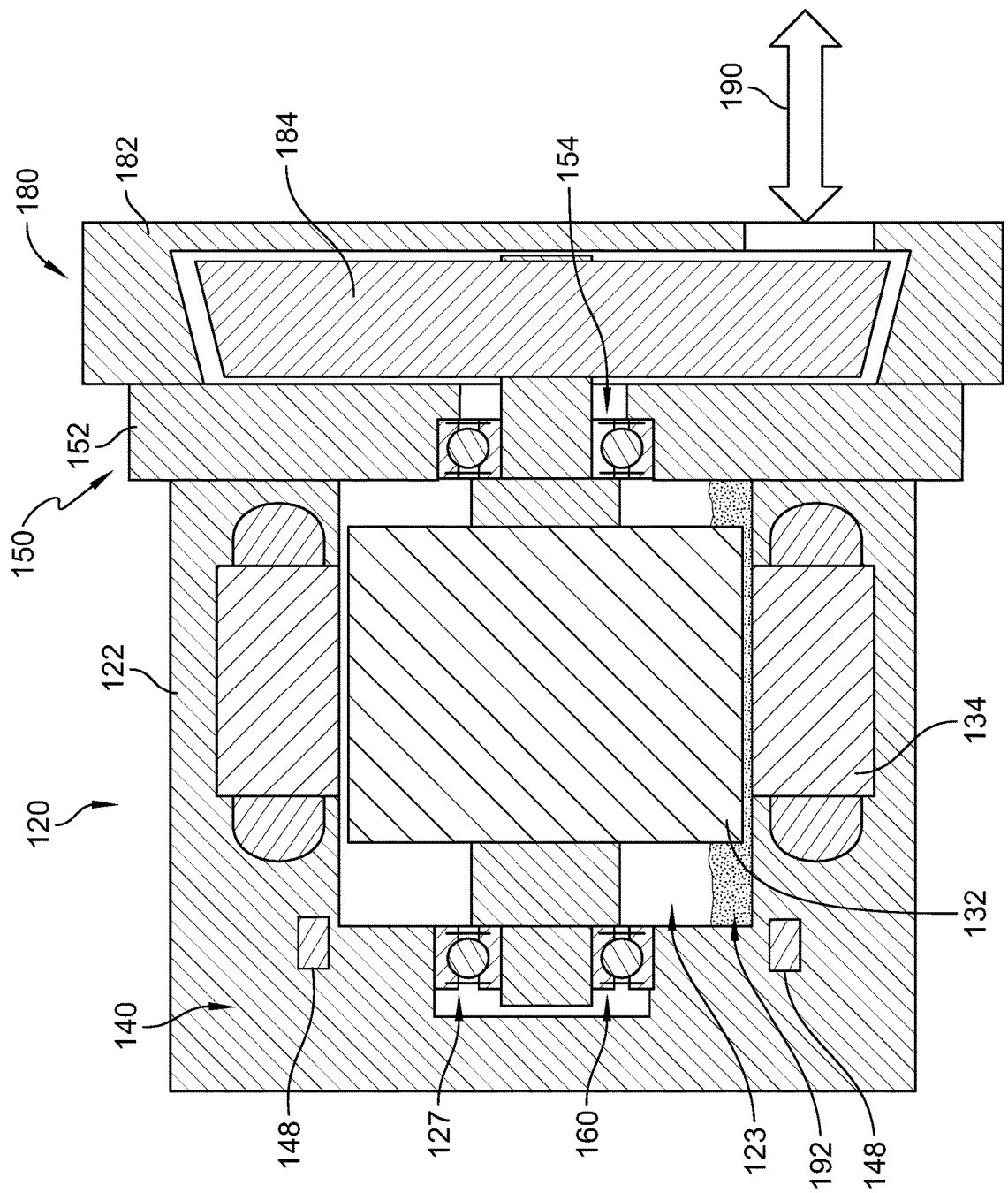
FIG. 2D is a cross-sectional view of the hydrogen recirculation pump of FIG. 2A, showing that the heaters arranged in the outer wall of the pump housing.

Illustratively, the pump motor assembly 120 further includes a heating assembly 140, as shown in FIGS. 2A, 2C, and 2D. As will be described in greater detail below, the heating assembly 140 is configured to increase a temperature of any portion of the fluid (e.g. condensed water 192 described below) that leaks from the impeller 184 into the pump cavity 123 and resides in the pump cavity 123. The increase in the temperature causes the fluid to flow toward the impeller 184 and exit the pump cavity 123. The heating assembly 140 includes at least one heater 142, 144, 146, 147, 148 arranged on or in the pump housing 122.

As shown in FIG. 2A, the heating assembly 140 can include a plurality of heaters 142, 144, 146 arranged in various locations around the outside of the pump housing 122. For example, a first heater 142 may be arranged on an axial end surface 129, or second side 129, of the pump housing 122 opposite a first side 128 of the housing 122 that is arranged on the bearing housing 152.

Additional heaters 144, 146 can be arranged around an outer annular surface 126 of the outer wall 124 of the pump housing 122. In some embodiments, the additional heaters 144, 146 can include two heaters, but in other embodiments, more heaters may be placed around the circumference of the pump housing 122 based on the heating requirements of the pump 110. In some embodiments, the heating assembly 140 may only include the two additional heaters 144, 146 (or only a single heater, heater 144 or heater 146) arranged around the outer annular surface 126. In some embodiments, the additional heater or heaters 144, 146 are arranged on the outer annular surface 126 of the pump housing 122 axially between the first side 128 and the second side 129 of the pump housing 122.

In some embodiments, the heating assembly 140 can include, alternatively to or in addition to the heaters 142, 144, 146 described above, an additional heater 147 or multiple additional heaters 147 arranged on the inside of the pump cavity 123, as shown in FIG. 2C. The heaters 147 can be arranged on the inner surface 125 of the outer wall 124 in some embodiments. In some embodiments, the heating assembly 140 can include, alternatively to or in addition to the heaters 142, 144, 146, 147 described above, an additional heater 148 or multiple additional heaters 148 arranged within the outer wall 124 of the pump housing 122, as shown in FIG. 2D. The heaters 148 can be arranged so as to be spaced apart from the inner surface 125 of the outer wall 124 in some embodiments.

A person skilled in the art will understand that any number of heaters 142, 144, 146, 147, 148 may be utilized based on the heating requirements of the pump 110. For example, in some embodiments, the heating assembly 140 can include heaters 142, 144, 146 on the outside of the pump housing 122 as well as heaters 147, 148 within the pump cavity 123 and within the outer wall 124. In some embodiments, the heating assembly 140 can only include heaters 142, 144, 146 on the outside of the pump housing 122 and heaters 147 within the pump cavity 123. In some embodiments, the heating assembly 140 can only include heaters 142, 144, 146 on the outside of the pump housing 122 and heaters 148 within the outer wall 124. In some embodiments, the heating assembly 140 can only include heaters 147 within the pump cavity 123 and heaters 148 within the outer wall 124.

As will be described in greater detail below, the heaters 142, 144, 146, 147, 148 are arranged in spaced apart relation to the impeller 184, i.e. the hydrogen process flow, as shown in FIGS. 2A, 2C, and 2D. In some embodiments, the heaters 142, 144, 146, 147, 148 are arranged axially closer to the second side 129 of the pump housing 122 than the first side 128 of the pump housing 122. In this way, the condensed water 192 that flows into the pump cavity 123 is heated at a position away from the impeller 184. As such, when the condensed water 192 in the pump cavity 122 is heated, it will flow towards the cooler impeller 184 in the direction 194, and thus exit the pump cavity 122, as shown in FIG. 2A.

The heaters 142, 144, 146, 147, 148 may be any heater known in the art that is capable of heating condensed water to a temperature high enough such that the water moves out of the pump cavity 123. In some embodiments, the heaters 142, 144, 146, 147, 148 are electrical heaters. In some embodiments, the heaters 142, 144, 146, 147, 148 are heated coolant-based heaters. In some embodiments, the heaters 142, 144, 146, 147, 148, in particular the heaters disposed within the pump cavity 122, are configured to be water-resistant such that any water residing in the pump cavity 122 does not short-circuit or affect performance of the heater. In some embodiments, as will be described in more detail below, the heaters 142, 144, 146, 147, 148 can be controlled via a controller 510 based on specific operating parameters and operating conditions of the pump 110.

As shown in FIG. 2A, the bearing assembly 150 includes a bearing housing 152, the bearing housing 152 having a first side 152A arranged on a second side 186 of the impeller housing 182 and a second side 152B arranged on the first side 128 of the pump housing 122. The bearing housing 152 may be formed to be cylindrical similar to the pump housing 122. The axial extent of the bearing housing 152 is shorter than the axial extent of the pump housing 122, as can be seen in FIG. 2A. The bearing housing 152 includes the bearing cavity 153 formed therein, which includes the first bearing seal 154. In some embodiments, the bearing cavity 153 is also formed to be annular and is sized similarly to the support cavity 127.

In some embodiments, as shown in FIG. 2A, the bearing cavity 153 includes at least a portion that has a diameter equal to the diameter of the support cavity 127. In this way, the first bearing seal 154 can be sized equally to the bearing seal 160. In some embodiments, the first bearing seal 154 may be sized such that an outer surface 154S of the bearing seal 154 contacts the inner surface 153S of the bearing cavity 153, as shown in FIG. 2C. In some embodiments, the bearing cavity 153 can be stepped such that a first, larger portion 153A of the stepped bearing cavity 153 has a greater diameter than a second, smaller portion 153B of the stepped bearing cavity 153.

As can be seen in FIG. 2A, the drive shaft 131 extends through the bearing cavity 153 and is rotationally supported by the first bearing seal 154. The drive shaft 131 is coupled to the impeller 184 at the terminal end 131AT of the first axial end portion 131A. The impeller 184 is arranged within an impeller cavity 183 defined within the impeller housing 182 of the impeller assembly 180. The impeller cavity 183 opens into the bearing cavity 153 so as to allow for the drive shaft 131 to extend through the bearing cavity 153 into the impeller cavity 183 and couple to the impeller 184. Similarly, the bearing cavity 153 opens into the pump cavity 123 so as to allow for the drive shaft 131 to extend from the pump cavity 123 into the bearing cavity 153 and subsequently to the impeller 184. As such, water which is to be eventually heated by the heating assembly 140 may leak into the pump cavity 122 via the impeller cavity 183 and into the bearing cavity 153 (i.e. through small gaps between the bearing seal 154 and the inner surface of the bearing cavity 153) and subsequently into the pump cavity 123.

The impeller housing 182 may be formed to be cylindrical similar to the pump housing 122 and the bearing housing 152, as shown in FIG. 2A. The axial extent of the impeller housing 182 may be greater than the axial extent of the bearing housing 152 and shorter than the axial extent of the pump housing 122. The impeller cavity 183 defined within the impeller housing 182 is sized so as to closely enclose the impeller 184 therein. As shown schematically in FIG. 2B, the impeller housing 182 includes two openings 187, 188, also referred to as an inlet 187 and an outlet 188. The inlet 187 and outlet 188 are formed in an axially end surface 185, or first side 185, of the impeller housing 182, one of which (outlet 188) is shown in FIG. 2A. The first side 185 may be opposite of the second side 186 of the impeller housing 182 that faces the bearing housing 152.

In operation, hydrogen 190, or other fluids depending on the usage of the pump 110, may flow into the impeller cavity 183 and thus into the impeller 184 via the inlet 187. The impeller 184 may then be rotated by the drive shaft 131 of the pump motor 130 so as to impel the hydrogen 190 and output it via the output 188. The inlet 187 is spaced apart from the outlet 188 on the axially end surface 185 of the impeller housing 182.

Figure 3:
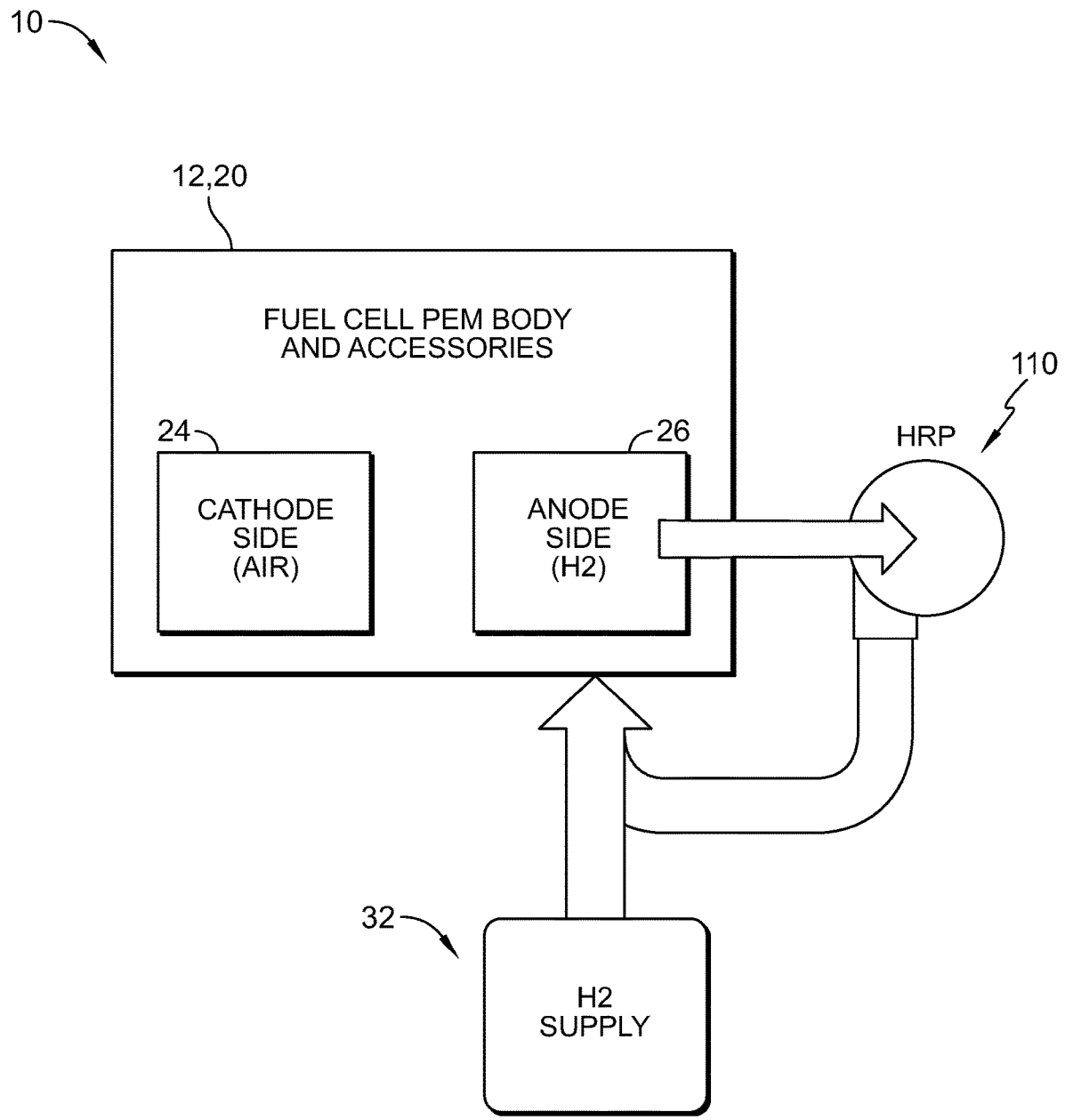
FIG. 3 is a schematic view of the hydrogen recirculation pump of FIG. 2A, showing the arrangement of the hydrogen recirculation pump relative to the fuel cell system components of the fuel cell system of FIGS. 1A-1D.

In some embodiments, the hydrogen recirculation pump 110 is located at a periphery of the fuel cell 20 and/or of the fuel cell stack 12, as shown in FIG. 3. As such, the hydrogen recirculation pump 110 is one of the first components of the fuel cell system 10 to cool when the system 10 is shut down. As warmer humidified hydrogen 190 resides within the fuel cell system 10, the pump 110, which is cooler than the other components of the system 10 at this point in time, acts as a condenser and will attract and retain condensed water 192 from the humidified hydrogen 190. This condensed water 192 will remain in the pump cavity 122 of the pump housing 122 of the pump 110.

In order to prevent the condensed water 192 from residing in the pump cavity 122 for an extending period of time, the heating assembly 140 described above is utilized, in particular the heaters 142, 144, 146, 147, 148 shown in FIGS. 2A, 2C, and 2D. The heaters 142, 144, 146, 147, 148 are arranged in spaced apart relation to the impeller 184, and as such, when the condensed water 192 in the pump cavity 122 is heated, it will flow towards the cooler impeller 184 in the direction 194 and exit the pump cavity 122. As a result, the amount of time that the condensed water 192 remains in the pump cavity 122 is significantly reduced. In this way, pump motor 130 internal components are kept dry for much longer periods of time, thus improving life and durability of the hydrogen recirculation pump 110.

As described above, the heaters 142, 144, 146 may be arranged on the outside of the pump housing 122, within the pump cavity 123, within the outer wall 124 of the pump housing 122, or any combination of these locations. These arrangements of the heaters 142, 144, 146 are advantageous over the heaters 142, 144, 146 being placed near or on the impeller housing 182. Although placing them near the impeller housing 182 could prevent the impeller 184 from freezing, this arrangement would drive the condensed water toward the cooler pump cavity 123, which would result in the water residing in the pump cavity 123. This would have the opposite of the desired effect of the described hydrogen recirculation pump 110, in particular to remove water from the pump cavity 123 and/or restrict entry of any water to the pump cavity 123. The arrangement of the heaters 142, 144, 146 on the pump housing 122 will nevertheless prevent freezing of the pump impeller 184.

Figure 4C:
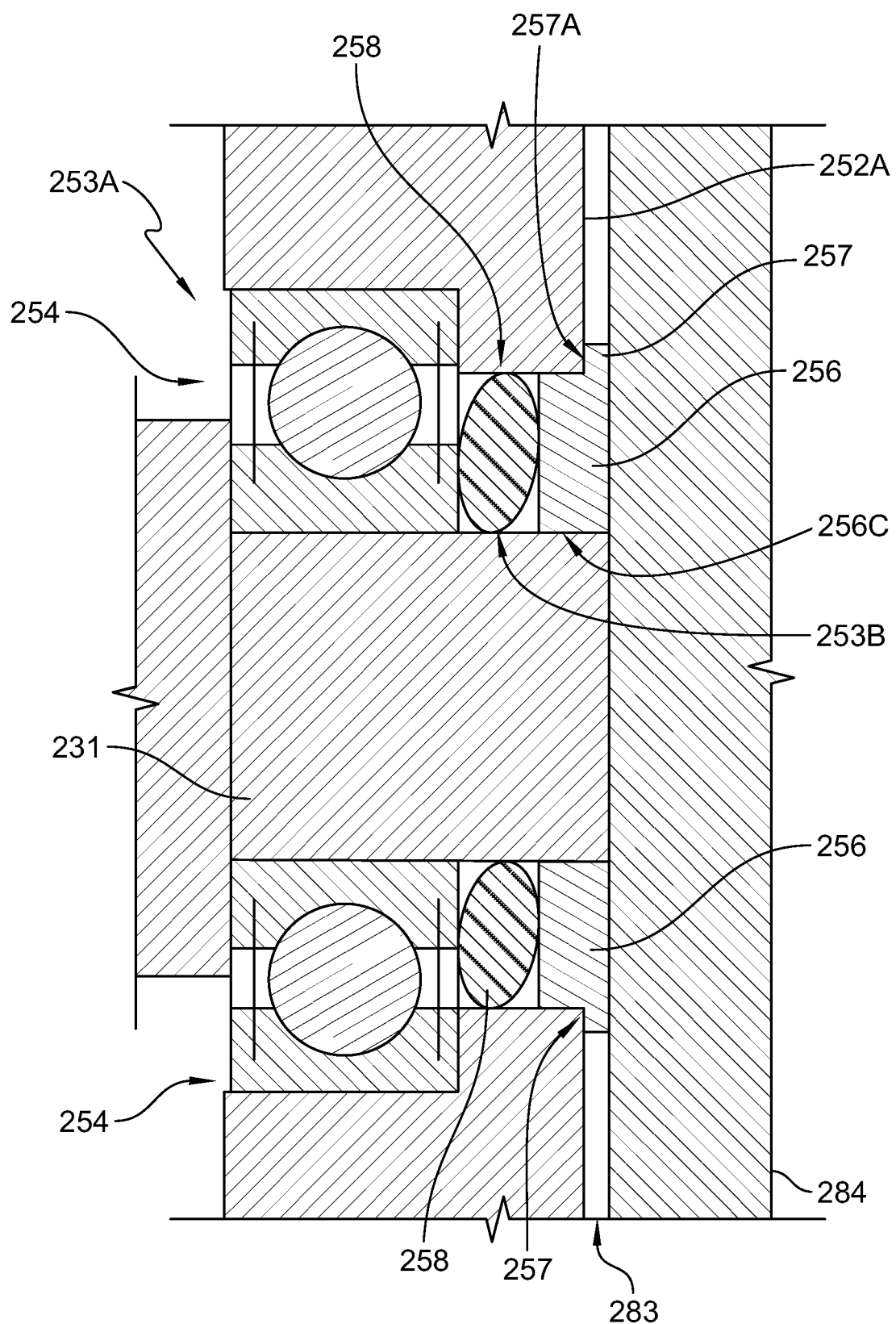
FIG. 4C is a cross-sectional view of the bearing seal, the grease material, and an alternative lip seal of the hydrogen recirculation pump of FIG. 4A, differing from the lip seal shown in FIGS. 4A and 4B in that the alternative lip seal includes a lip that rests on an outer surface of the bearing housing.

Another embodiment of a hydrogen recirculation pump 210 in accordance with the present disclosure is shown in FIGS. 4A-4C. The hydrogen recirculation pump 210 is substantially similar to the hydrogen recirculation pump 110 described herein. Accordingly, similar reference numbers in the 200 series indicate features that are common between the hydrogen recirculation pump 210 and the hydrogen recirculation pump 110. The description of the hydrogen recirculation pump 110 is incorporated by reference to apply to the hydrogen recirculation pump 210, except in instances when it conflicts with the specific description and the drawings of the hydrogen recirculation pump 210. Any combination of the components of the hydrogen recirculation pump 110 and the hydrogen recirculation pump 210 described in further detail below may be utilized in an assembly of the present disclosure.

The hydrogen recirculation pump 210 is formed substantially similar to the hydrogen recirculation pump 110, in particular including a pump motor assembly 210, a bearing assembly 250, and an impeller assembly 280, as shown in FIG. 4A. The hydrogen recirculation pump 210 differs from the hydrogen recirculation pump 110 at least in that, instead of utilizing a heating assembly 140 to remove water from inside the pump cavity 223, the bearing assembly 250 further includes a lip seal 256 and a grease material 258 arranged within the bearing cavity 253 that is configured to prevent any water from entering the pump cavity 223. A person skilled in the art will understand that, in some embodiments, heaters, such as those of the heating assembly 140, may be included along with the lip seal 256 and grease material 258 in order to add a redundancy in cases in which a small amount of water penetrates past the seal 256 and the bearing seal 254 and into the pump cavity 223.

As can be seen in greater detail in FIG. 4B, the lip seal 256, which may be an annular seal that extends circumferentially around the drive shaft 231, is arranged within the bearing cavity 253 adjacent to the bearing seal 254. In particular, the lip seal 256 may be arranged between the bearing seal 254 and an opening 259 of the bearing cavity 253 that opens into the impeller cavity 283. In some embodiments, the lip seal 256 may include a circumferential outer surface 256A that contacts an inner surface 253S of the bearing cavity 253, and a circumferential inner surface 256B that contacts the drive shaft 231 so as to form the seal. The bearing cavity 253 can be stepped such that a first, larger portion 253A of the stepped bearing cavity 253 has a greater diameter than a second, smaller portion 253B of the stepped bearing cavity 253. Because the bearing seal 254 is arranged in the larger portion 253A, the lip seal 256 may be arranged in the smaller portion 253B.

In some embodiments, as shown in FIG. 4C, the lip seal 256 may include a lip 257 that is located slightly beyond the opening 259 and extends radially and slightly onto the bearing housing 252. As a result, the axial surface 257A of the lip 257 facing the bearing housing 252 is securely pressed against the first side 252A of the bearing housing 252, while the remainder of the body 256C of the seal 256 is arranged within the bearing cavity 253. In some embodiments, the lip 257 is axially spaced apart from the impeller 284. In either arrangement of the lip seal 256, as shown in FIGS. 4B and 4C, as well as any other embodiments conceivable to a person skilled in the art, the lip seal 256 is oriented and configured to retain grease material 258 and allow pressure to escape towards the impeller assembly 280 while also sealing against incoming pressure from the impeller assembly 280.

Illustratively, the grease material 258, which serves as a lubricant between the bearing seal 254 and the lip seal 258, is arranged axially between the bearing seal 254 and the lip seal 258 and contacts both the bearing seal 254 and the lip seal 258, as shown in FIG. 4B and FIG. 4C. The grease material 258 may also contact the drive shaft 231 and may also contact the inner surface 253S of the bearing cavity 253.

In some embodiments, the lip seal 256 is comprised of a fluoroelastomeric material and the grease material 258 is comprised of a hydrogen resistant material. In some embodiments, the grease material 228 is comprised of perfluoropolyether. These materials provide high resistance to chemical damage caused by the hydrogen flowing within the pump 210, in particular within the impeller cavity 283. These materials provide significant improvements in chemical damage resistance over the types of materials typically used for seals and corresponding lubricant/grease in lip seal and bearing seal arrangements.

Another embodiment of a hydrogen recirculation pump 310 in accordance with the present disclosure is shown in FIG. 5. The hydrogen recirculation pump 310 is substantially similar to the hydrogen recirculation pumps 110, 210 described herein. Accordingly, similar reference numbers in the 300 series indicate features that are common between the hydrogen recirculation pump 310 and the hydrogen recirculation pumps 110, 210. The description of the hydrogen recirculation pumps 110, 210 are incorporated by reference to apply to the hydrogen recirculation pump 310, except in instances when they conflict with the specific description and the drawings of the hydrogen recirculation pump 310. Any combination of the components of the hydrogen recirculation pumps 110, 210 and the hydrogen recirculation pump 310 described in further detail below may be utilized in an assembly of the present disclosure.

The hydrogen recirculation pump 310 is formed substantially similar to the hydrogen recirculation pumps 110, 210, in particular including a pump motor assembly 310, a bearing assembly 350, and an impeller assembly 380, as shown in FIG. 5. The hydrogen recirculation pump 310 differs from the hydrogen recirculation pumps 110, 210 at least in that the pump 310 includes a heating assembly 340 that does not include heaters, but instead utilizes a fluidic heating circuit 342 to pump warm water 341 through the pump cavity 323. The warm water 341 warms the condensed water 392 that has leaked into the pump cavity 323, thus heating the condensed water 392 and forcing it toward the impeller 384 and out of the pump cavity 323.

Illustratively, the heating assembly 340 may include a first conduit 344 formed in the bearing housing 352, as shown in FIG. 5. The first conduit 344 is a fluidic line, which may be a pipe, tube, or similar cavity formed in the housing 352. The first conduit 344 is configured to transport fluid, in particular warm water 341, from an inlet 345 of the first conduit 344 and into the pump cavity 323. The warm water 341 may then flow through the pump cavity 323 so as to heat the condensed water 392 residing in the pump cavity 323. In some embodiments, the warm water 341 is sufficiently hotter than the condensed water 392 so as to cause the condensed water 392 to heat enough so as to move toward the impeller 384 and out of the pump cavity 323.

In some embodiments, an outlet 346 of the first conduit 344 that opens into the pump cavity 323 is arranged underneath the drive shaft 331 and oriented so as to direct the warm water 341 toward the condensed water 392 resting on a bottommost inner surface 323B of the pump cavity 323. The warm water 341 may be pumped through the first conduit 344 and into the pump cavity 323 via a pump 370. In some embodiments, as will be described in more detail below, the pump 370 can be controlled via the controller 510 based on specific operating parameters and operating conditions of the pump 110.

Illustratively, the heating assembly 340 may include a second conduit 347 formed in the bearing housing 352, as shown in FIG. 5. The second conduit 347 is a fluidic line, which may be a pipe, tube, or similar cavity formed in the housing 352. The second conduit 347 opens into the pump cavity 323 at an opening 348 and is configured to transport the warm water 341 from the pump cavity 323 to an outlet 349 of the second conduit 347. In some embodiments, the opening 348 is arranged such that a maximum amount of the heated water 392 flows through the opening 348, through the conduit 347, and exits the conduit 347 via the outlet 349.

In some embodiments, both the warmed water 341 and the heated water 392, which can mix together, will be forced toward the impeller 384 due to the heating of the water 392 via the warm water 341 and the flow path of the warm water 341 as it is pumped through the pump cavity 323, as shown in FIG. 5. As a result, in some embodiments, a portion of the warmed water 341 and the heated water 392 will exit the pump cavity 323 via the second conduit 347, while another portion of the warmed water 341 and the heated water 392 will exit via the bearing cavity 353 and into the impeller cavity 383. In some embodiments, the heating assembly 340 does not include the second conduit 347, and all of the warmed water 341 and the heated water 392 exits the pump cavity 323 via the bearing cavity 353 and into the impeller cavity 383. In some embodiments, the pump 310 may include heaters, such as the heaters 142, 144, 146, 147, 148 described above in addition to the fluidic heating circuit 342, so as to provide a redundancy in the event of failure of one or more of the components.

In some embodiments, the warm water 341 may be provided to the first conduit 344 from a reservoir or other water source separate from the fuel cell stack 12. In some embodiments, the warm water 341 may be any other fluid that may not mix with the condensed water 392 but nevertheless is hot enough to heat the condensed water 392 so as to cause it to flow towards the impeller 384 and out of the pump cavity 323. In some embodiments, the cooling fluid 36 flowing through the bipolar plates (BPP) 28, 30 in order to cool the plates 28, 30 may be bled from that flow and used as the warm water 341 or warm fluid to heat the condensed water 392.

According to a further aspect of the present disclosure, a method of recirculating fluid (such as condensed water 192 formed from humidified hydrogen 190) in a fuel cell system, such as via a pump 110 of the fuel cell system 10 described above, includes a first operation of providing a pump motor assembly, such as the pump motor assembly 120 described above, including a pump housing 122 having a pump cavity 123 therein and a pump motor 130 arranged in the pump cavity 123. The method includes a second operation of arranging at least one heater, such as the heaters 142, 144, 146, 147, 148 described above, on or in the pump housing 122 and spaced apart from an impeller, such as the impeller 184 described above, and a third operation of rotating the impeller 184 via the pump motor 130 such that the impeller 184 impels the fluid from an inlet 187 of the impeller 184 to an outlet 188 of the impeller 184. The pump housing 122 can be arranged axially away from the impeller 184.

The method can further include a fourth operation of, in response to the fuel cell system 10 being shut off, activating the at least one heater 142, 144, 146, 147, 148 and increasing a temperature of any portion of the fluid 192 that leaks from the impeller 184 into the pump cavity 123 and resides in the pump cavity 123 with the controller 510. Increasing the temperature causes the fluid 192 residing in the pump cavity 123 to flow toward the impeller 184 and exit the pump cavity 123. The method can further include a fifth operation of, in response to the at least one heater 142, 144, 146, 147, 148 having been active for a first amount of time based on a first operating condition of the fuel cell system 10, deactivating the at least one heater 142, 144, 146, 147, 148 via the controller 510. In some embodiments, the first operating condition of the fuel cell system 10 is when all fluid 192 residing in the pump cavity 123 has exited the pump cavity 123 via the increase in temperature caused by the at least one heater 142, 144, 146, 147, 148.

A person skilled in the art will understand that other operating conditions and timings of when to activate and deactivate the at least one heater can be utilized. Moreover, the method may further include pumping water through the pump cavity, such as in embodiments similar to the pump 310 described above including the fluidic heating circuit 342, based on certain operating conditions of the fuel cell system 10. By way of a non-limiting example, the controller 510 can be configured to activate the heaters 142, 144, 146, 147, 148 and/or the pump 370 of the fluidic heating circuit 342 immediately after the fuel cell system 10 is shut off. In some embodiments, the controller 510 can be configured to activate the heaters 142, 144, 146, 147, 148 and/or the pump 370 of the fluidic heating circuit 342 after a certain predetermined amount of time since the fuel cell system 10 has been shut off. In some embodiments, the controller 510 can be configured to activate the heaters 142, 144, 146, 147, 148 and/or the pump 370 of the fluidic heating circuit 342 in response to an operating parameter being detected within the recirculation pump 110, 310.

Figure 6:
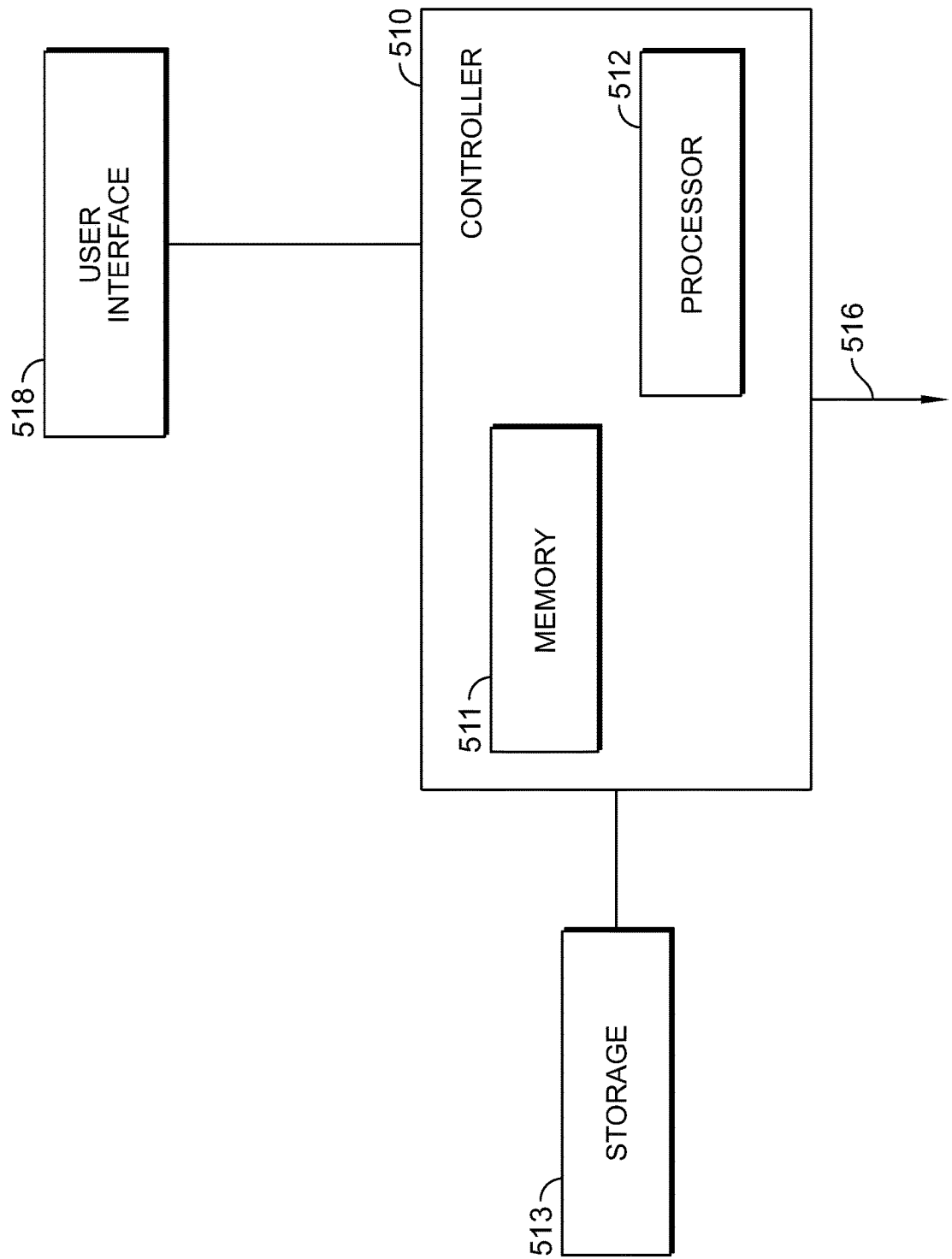
FIG. 6 is a schematic view of a controller and related components configured to be utilized with the hydrogen recirculation pumps of FIGS. 1-5.

The controller 510, as described above, is shown in FIG. 6. The controller 510 may include a memory 511, and a processor 512. The memory 511 and processor 512 are in communication with each other. The processor 512 may be embodied as any type of computational processing tool or equipment capable of performing the functions described herein. For example, the processor 512 may be embodied as a single or multi-core processor(s), digital signal processor, microcontroller, or other processor or processing/controlling circuit.

The memory 511 may be embodied as any type of volatile or non-volatile memory or data storage capable of performing the functions described herein, and may include additional storage 513. Moreover, the controller 510 may also include additional or alternative components, such as those commonly found in a computer (e.g., various input/output devices, resistors, capacitors, etc.). In other embodiments, one or more of the illustrative controllers 510 of components may be incorporated in, or otherwise form a portion of, another component. For example, the memory 511, or portions thereof, may be incorporated in the processor 512.

In operation, the memory 511 may store various data and software used during operation of the controller 510 such as operating systems, applications, programs, libraries, and drivers. The memory 511 is communicatively coupled to the processor 512 via an I/O subsystem, which may be embodied as circuitry and/or components to facilitate input/output operations with the processor 512, the memory 511, and other components of the controller 510. In one embodiment, the memory 511 may be directly coupled to the processor 512, for example via an integrated memory controller hub. Additionally, in some embodiments, the I/O subsystem may form a portion of a system-on-a-chip (SoC) and be incorporated, along with the processor 512, the memory 511, and/or other components of the controller 510, on a single integrated circuit chip (not shown).

The components of the communication network 516 may be configured to use any one or more communication technologies (e.g., wired, wireless and/or power line communications) and associated protocols (e.g., Ethernet, InfiniBand®, Bluetooth®, Wi-Fi®, WiMAX, 3G, 4G LTE, 5G, etc.) to effect such communication among and between system components and devices as described above, including but not limited to between a user interface 518 and the heaters 142, 144, 146, 147, 148, between the interface 518 and the pump 370, between the individual heaters 142, 144, 146, 147, 148, and other communications within the fuel cell system 10 as would be understood by a person skilled in the art.

The following described aspects of the present disclosure are contemplated and non-limiting:

A first aspect of the present disclosure relates to a recirculation pump for a fuel cell system. The recirculation pump includes an impeller, a pump motor assembly, and at least one heater. The impeller is configured to rotate and impel a fluid from an inlet to an outlet. The pump motor assembly includes a pump housing having a pump cavity therein and a pump motor arranged in the pump cavity. The pump motor is configured to drive the impeller, and the pump housing is arranged axially ways from the impeller. The at least one heater is disposed on or in the pump housing and is spaced apart from the impeller. The at least one heater is configured to increase a temperature of any portion of the fluid that leaks from the impeller into the pump cavity and resides in the pump cavity. The increase in the temperature causes the fluid that resides in the pump cavity to flow toward the impeller and exit the pump cavity.

A second aspect of the present disclosure relates to a recirculation pump for a fuel cell system. The recirculation pump includes an impeller and a bearing assembly. The impeller includes a drive shaft centrally coupled to the impeller and is configured to rotate and impel a fluid from an inlet of the impeller to an outlet of the impeller. The bearing assembly is arranged axially away from the impeller, and includes a bearing housing having a bearing cavity defined therein and a bearing seal arranged in the bearing cavity. The drive shaft extends from the impeller and through the bearing cavity, and is arranged within and rotatably supported by the bearing seal. The bearing assembly further includes a lip seal disposed within the bearing cavity and a grease material disposed within the bearing cavity between the lip seal and the bearing seal.

A third aspect of the present disclosure relates to a method of recirculating fluid in a fuel cell system. The method includes providing a pump motor assembly including a pump housing having a pump cavity therein and a pump motor arranged in the pump cavity; arranging at least one heater on or in the pump housing and spaced apart from an impeller; and rotating the impeller via the pump motor such that the impeller impels the fluid from an inlet of the impeller to an outlet of the impeller. The pump housing is arranged axially away from the impeller. The method also includes, in response to the fuel cell system being shut off, via a controller, activating the at least one heater and increasing a temperature of any portion of the fluid that leaks from the impeller into the pump cavity and resides in the pump cavity. Increasing the temperature causes the fluid residing in the pump cavity to flow toward the impeller and exit the pump cavity. The method further includes, in response to the at least one heater having been active for a first amount of time based on a first operating condition of the fuel cell system, via the controller, deactivating the at least one heater.

In the first aspect of the present disclosure, the recirculation pump may further comprise an impeller assembly. The impeller assembly may include an impeller housing having an impeller cavity therein and have the inlet and the outlet. The inlet may be spaced apart from the outlet on a first side of the impeller housing. Each of the inlet and outlet may open into the impeller cavity. The impeller assembly may further include the impeller arranged in the impeller cavity and configured to impel the fluid entering the impeller cavity from the inlet to the outlet such that the fluid exits the impeller housing via the outlet.

In the first aspect of the present disclosure, the pump housing may be disposed on a second side of the impeller housing opposite the first side. A first heater of the at least one heater may be arranged on a second side of the pump housing opposite a first side of the pump housing facing the impeller housing. In the first aspect of the present disclosure, a second heater of the at least one heater may be arranged on an outer surface of the pump housing axially between the first side and the second side of the pump housing. In the first aspect of the present disclosure, the second heater may be located axially closer to the second side of the pump housing than the first side of the pump housing. In the first aspect of the present disclosure, at least one additional heater of the at least one heater and the second heater may be arranged on the outer surface of the pump housing axially between the first side and the second side of the pump housing.

In the first aspect of the present disclosure, the pump motor may be coupled to the impeller via a drive shaft, and the pump motor may drive rotation of the drive shaft and rotation of the impeller. In the first aspect of the present disclosure, the recirculation pump may further comprise a bearing assembly arranged axially between the pump motor assembly and the impeller assembly. The bearing assembly may include including a bearing housing having a first side arranged on a second side of the impeller housing opposite the first side of the impeller housing and having a bearing cavity defined therein. The bearing assembly may further include a bearing seal arranged in the bearing cavity. The drive shaft may extend from the pump motor through the bearing cavity and to the impeller. The drive shaft may be arranged within and rotatably supported by the bearing seal. In the first aspect of the present disclosure, the bearing assembly may further include a lip seal disposed within the bearing cavity between the bearing seal and the impeller and a grease material disposed within the bearing cavity between the lip seal and the bearing seal. The grease material may be arranged adjacent to and abutting the bearing seal and arranged around a circumferential outer surface of the drive shaft. In the first aspect of the present disclosure, the lip seal may be arranged so as to retain the grease material in position abutting the bearing seal, so as to allow pressure to escape the pump cavity, and so as to seal against pressure from the impeller cavity. In the first aspect of the present disclosure, the lip seal may be comprised of a fluoroelastomeric material and the grease material may be comprised of a hydrogen resistant material. In the first aspect of the present disclosure, the grease material may be comprised of perfluoropolyether.

In the second aspect of the present disclosure, the lip seal may be arranged so as to retain the grease material between the lip seal and the bearing seal, so as to allow pressure to escape the pump cavity, and so as to seal against pressure from the impeller cavity.

In the second aspect of the present disclosure, the lip seal may be comprised of a fluoroelastomeric material, and the grease material may be comprised of a hydrogen resistant material. In the second aspect of the present disclosure, the grease material may be comprised of perfluoropolyether.

In the second aspect of the present disclosure, the recirculation pump may further comprise a pump motor assembly and at least one heater. The pump motor assembly may include a pump housing having a pump cavity therein and a pump motor arranged in the pump cavity. The drive shaft may be coupled to the pump motor such that the pump motor is configured to drive the impeller. The pump housing may be arranged adjacent to the bearing housing on a side of the bearing housing opposite the impeller. The at least one heater may be on or in the pump housing and spaced apart from the bearing housing. The at least one heater may be configured to increase a temperature of any portion of the fluid that leaks from the impeller, through the bearing cavity, and into the pump cavity and resides in the pump cavity. The increase in the temperature may cause the fluid that resides in the pump cavity to flow toward the impeller and exit the pump cavity. In the second aspect of the present disclosure, a first heater of the at least one heater may be arranged on a second side of the pump housing opposite a first side of the pump housing facing the bearing housing. A second heater of the at least one heater may be arranged on an outer surface of the pump housing axially between the first side and the second side of the pump housing.

In the third aspect of the present disclosure, the first operating condition may be when all fluid residing in the pump cavity has exited the pump cavity via the increase in temperature caused by the at least one heater. In the third aspect of the present disclosure, the method may further include arranging the impeller including an impeller housing having a first side and a second side opposite the first side; arranging a first side of the pump housing on the second side of the impeller housing; and arranging a first heater of the at least one heater on a second side of the pump housing opposite the first side of the pump housing facing the impeller housing.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A recirculation pump for a fuel cell system, comprising:
   an impeller configured to rotate and impel a fluid from an inlet to an outlet;
   a pump motor assembly including a pump housing having a pump cavity therein and a pump motor arranged in the pump cavity and configured to drive the impeller, the pump housing arranged axially away from the impeller; and
   at least one heater disposed on or in the pump housing and spaced apart from the impeller, the at least one heater being configured to increase a temperature of any portion of the fluid that leaks from the impeller into the pump cavity and resides in the pump cavity, wherein the increase in the temperature causes the fluid that resides in the pump cavity to flow toward the impeller and exit the pump cavity.

2. The recirculation pump of claim 1, further comprising:
   an impeller assembly including an impeller housing having an impeller cavity therein and having the inlet and the outlet, the inlet spaced apart from the outlet on a first side of the impeller housing, each of the inlet and outlet opening into the impeller cavity, the impeller assembly further including the impeller arranged in the impeller cavity and configured to impel the fluid entering the impeller cavity from the inlet to the outlet such that the fluid exits the impeller housing via the outlet.

3. The recirculation pump of claim 2, wherein the pump housing is disposed on a second side of the impeller housing opposite the first side, and wherein a first heater of the at least one heater is arranged on a second side of the pump housing opposite a first side of the pump housing facing the impeller housing.

4. The recirculation pump of claim 3, wherein a second heater of the at least one heater is arranged on an outer surface of the pump housing axially between the first side and the second side of the pump housing.

5. The recirculation pump of claim 4, wherein the second heater is located axially closer to the second side of the pump housing than the first side of the pump housing.

6. The recirculation pump of claim 4, wherein at least one additional heater of the at least one heater and the second heater are arranged on the outer surface of the pump housing axially between the first side and the second side of the pump housing.

7. The recirculation pump of claim 2, wherein the pump motor is coupled to the impeller via a drive shaft, and wherein the pump motor drives rotation of the drive shaft and rotation of the impeller.

8. The recirculation pump of claim 7, further comprising:
   a bearing assembly arranged axially between the pump motor assembly and the impeller assembly, the bearing assembly including a bearing housing having a first side arranged on a second side of the impeller housing opposite the first side of the impeller housing and having a bearing cavity defined therein, the bearing assembly further including a bearing seal arranged in the bearing cavity,
   wherein the drive shaft extends from the pump motor through the bearing cavity and to the impeller, and wherein the drive shaft is arranged within and rotatably supported by the bearing seal.

9. The recirculation pump of claim 8, wherein the bearing assembly further includes a lip seal disposed within the bearing cavity between the bearing seal and the impeller and a grease material disposed within the bearing cavity between the lip seal and the bearing seal, the grease material being arranged adjacent to and abutting the bearing seal and arranged around a circumferential outer surface of the drive shaft.

10. The recirculation pump of claim 9, wherein the lip seal is arranged so as to retain the grease material in position abutting the bearing seal, so as to allow pressure to escape the pump cavity, and so as to seal against pressure from the impeller cavity.

11. The recirculation pump of claim 9, wherein the lip seal is comprised of a fluoroelastomeric material and the grease material is comprised of a hydrogen resistant material.

12. The recirculation pump of claim 11, wherein the grease material is comprised of perfluoropolyether.

13. The recirculation pump of claim 1, wherein the at least one heater is disposed on an outer surface of the pump housing.

14. The recirculation pump of claim 13, further comprising:
   an impeller assembly including an impeller housing having the inlet and the outlet, the inlet spaced apart from the outlet on a first side of the impeller housing, and
   wherein the at least one heater is a first heater, and the pump housing is disposed on a second side of the impeller housing opposite the first side, and wherein a second heater of the at least one heater is arranged on an axial end surface of the pump housing opposite a first side of the pump housing facing the impeller housing.

15. The recirculation pump of claim 14, wherein the outer surface of the pump housing extends axially between the first side and the axial end surface of the pump housing.

16. A method of recirculating fluid in a fuel cell system, comprising:
   providing a pump motor assembly including a pump housing having a pump cavity therein and a pump motor arranged in the pump cavity;
   arranging at least one heater on or in the pump housing and spaced apart from an impeller;
   rotating the impeller via the pump motor such that the impeller impels the fluid from an inlet of the impeller to an outlet of the impeller, wherein the pump housing is arranged axially away from the impeller;
   in response to the fuel cell system being shut off, via a controller, activating the at least one heater and increasing a temperature of any portion of the fluid that leaks from the impeller into the pump cavity and resides in the pump cavity, wherein increasing the temperature causes the fluid residing in the pump cavity to flow toward the impeller and exit the pump cavity; and
   in response to the at least one heater having been active for a first amount of time based on a first operating condition of the fuel cell system, via the controller, deactivating the at least one heater.

17. The method of claim 16, wherein the first operating condition is when all fluid residing in the pump cavity has exited the pump cavity via the increase in temperature caused by the at least one heater.

18. The method of claim 16, wherein the at least one heater is a first heater, and wherein the step of arranging includes arranging the at least one heater on an outer surface of the pump housing.

19. The method of claim 18, further comprising:
- arranging the impeller in an impeller housing having a first side and a second side opposite the first side;
- arranging a first side of the pump housing on the second side of the impeller housing; and
- arranging a second heater on an axial end surface of the pump housing opposite the first side of the pump housing facing the impeller housing.

20. The method of claim 19, wherein the first heater is located axially closer to the axial end surface of the pump housing than the first side of the pump housing.

* * * * *